United States Patent Office 3,368,196
Patented Feb. 6, 1968

3,368,196
ACOUSTICAL VELOCITY WELL LOGGING SYSTEM FEATURING SIMPLIFIED EXPLORING UNIT
Roy P. Mazzagatti, Bellaire, and Donald J. Dowling and Cloy N. Causey, Houston, Tex., assignors to Texaco Inc., New York, N.Y., a corporation of Delaware
Continuation-in-part of application Ser. No. 842,922, Sept. 28, 1959. This application Apr. 12, 1966, Ser. No. 552,996
17 Claims. (Cl. 340—18)

ABSTRACT OF THE DISCLOSURE

The present invention relates to an acoustical velocity well logging system having a relatively simple exploring unit or logging tool adapted to be passed through a well bore and which includes an acoustical transmitting transducer for transmitting an acoustic pulse through earth formations adjacent the logging tool and which further comprises an acoustic pulse generating circuit including an acoustical transmitter transducer comprising a transformer and energy storing means and a silicon controlled rectifier, wherein trigger pulse means are disposed at the earth's surface adjacent the bore hole and where means are provided for applying the output of a trigger pulse producing means to the control element of said silicon controlled rectifier for periodically discharging the energy in said storing means to said transformer to activate the transmitting transducer and wherein means are further provided for detecting acoustic pulses transmitted through earth formations from said transmitting transducer comprising first and second acoustic pulse receiving transducers spaced from one another and from the transmitting transducer and wherein a transformer means is provided for coupling the signals detected by the receiving transducers to a signal transmission system for transmitting same to the surface where time interval measuring means are coupled to the other end of said transmission system for providing an indication of the time interval between the occurrence of given acoustic pulses detected by said first and second acoustic pulse receiving transducers.

This application is a continuation-in-part of application Ser. No. 842,922, filed Sept. 28, 1959, and now abandoned.

This invention relates to an acoustical velocity well logging system and more particularly to a well logging system having a relatively simple and inexpensive exploring unit or tool which provides accurate acoustical velocity measurements of formations traversed by a well bore.

In the field of acoustical velocity logging, prior art systems utilize a sonde or exploring unit which contains an electroacoustical transmitting transducer and one or more electroacoustical receiving transducers. Furthermore, the exploring unit contains an electronic transmitting circuit which provides a sharp pulse to actuate the transmitting transducer and a receiver amplifier coupled to the output of each of the receiver transducers. Because of the extensive electronic circuitry including a substantial number of electronic tube-type devices contained in the exploring unit, the exploring unit is both large in size and expensive to fabricate or construct.

In field operations it is desirable to have an exploring unit which is of a small size and a rugged construction because of the resulting ease of handling with limited available personnel. It is also, of course, very desirable for economic reasons that the cost of the exploring unit be reduced from the cost of presently used exploring units. In logging open boreholes and seismic shot holes, in particular, the exploring unit of the well logging system is often stuck and eventually lost in the borehole. Accordingly, the exploring unit of the system should be of an inexpensive nature such that a loss of an exploring unit would be economically reasonable and such that the use of such an exploring unit would be considered reasonable for boreholes even in poor condition. In certain areas seismic shot holes are difficult to drill and after drilling the holes may cave in in just a few minutes. In such areas there is considerable risk of losing an exploring unit and, therefore, with the present relatively expensive units the velocity information often is not obtained due to failure to risk losing the unit during the running of a log of the borehole.

In accordance with the present invention an improved acoustical velocity well logging system is provided wherein the exploring unit is reduced substantially in size and complexity as compared to the exploring units used in prior art acoustic velocity logging systems. More particularly, the present invention provides an improved acoustical velocity well logging system which includes an exploring unit which does not contain a single electronic tube-type device but wherein only a single, or at the most a few, semi-conductor devices need be provided.

Figures 1, 2:
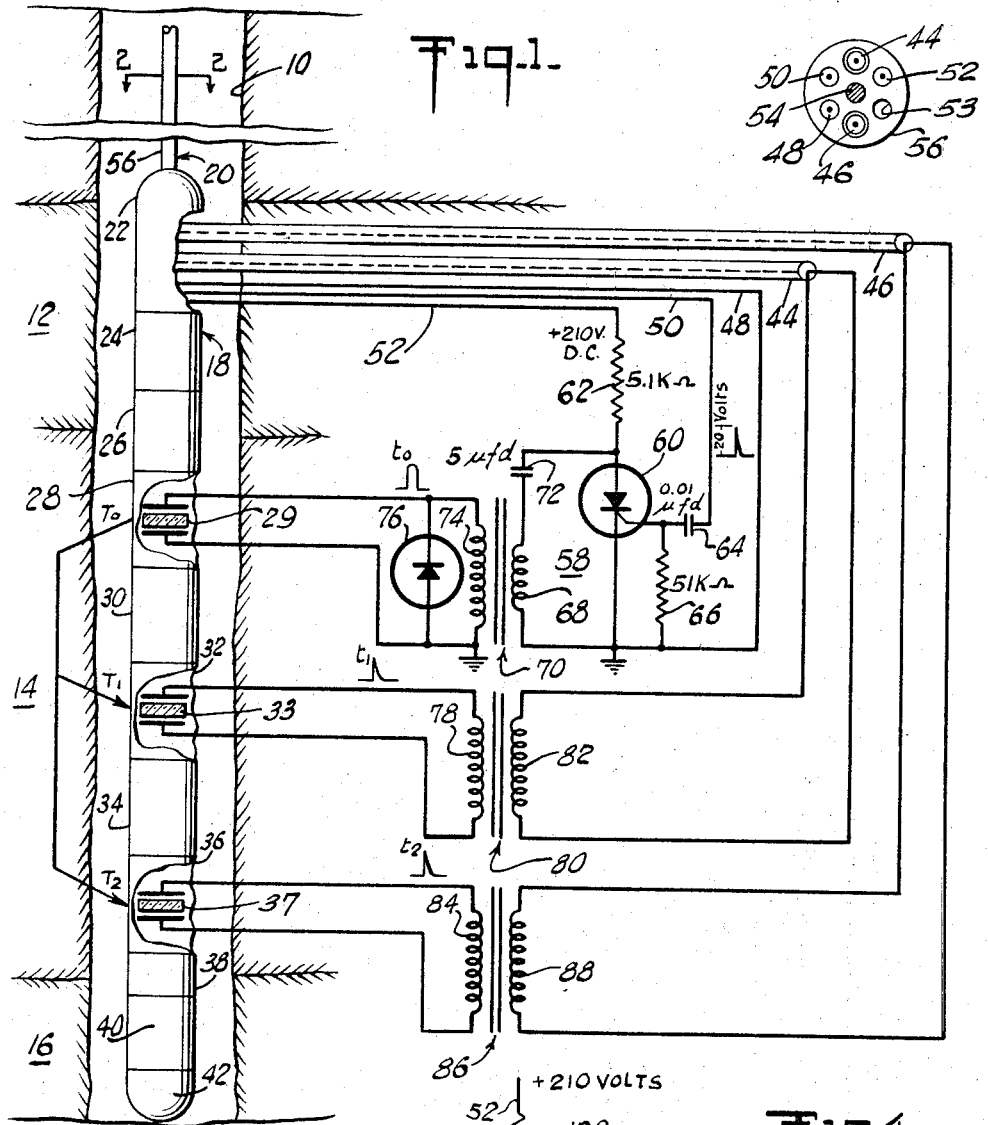
Figure 4:
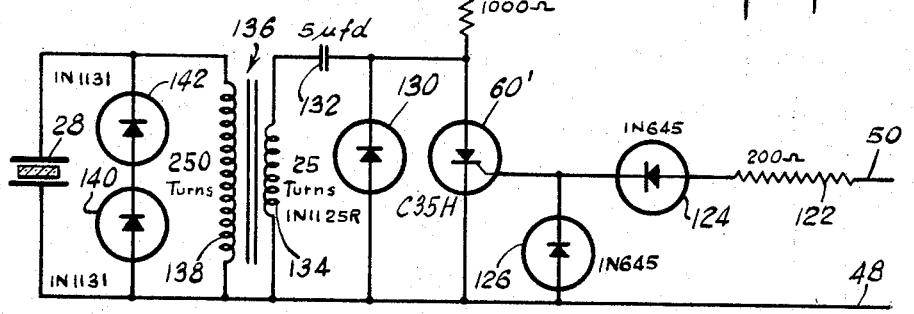
Figure 5:
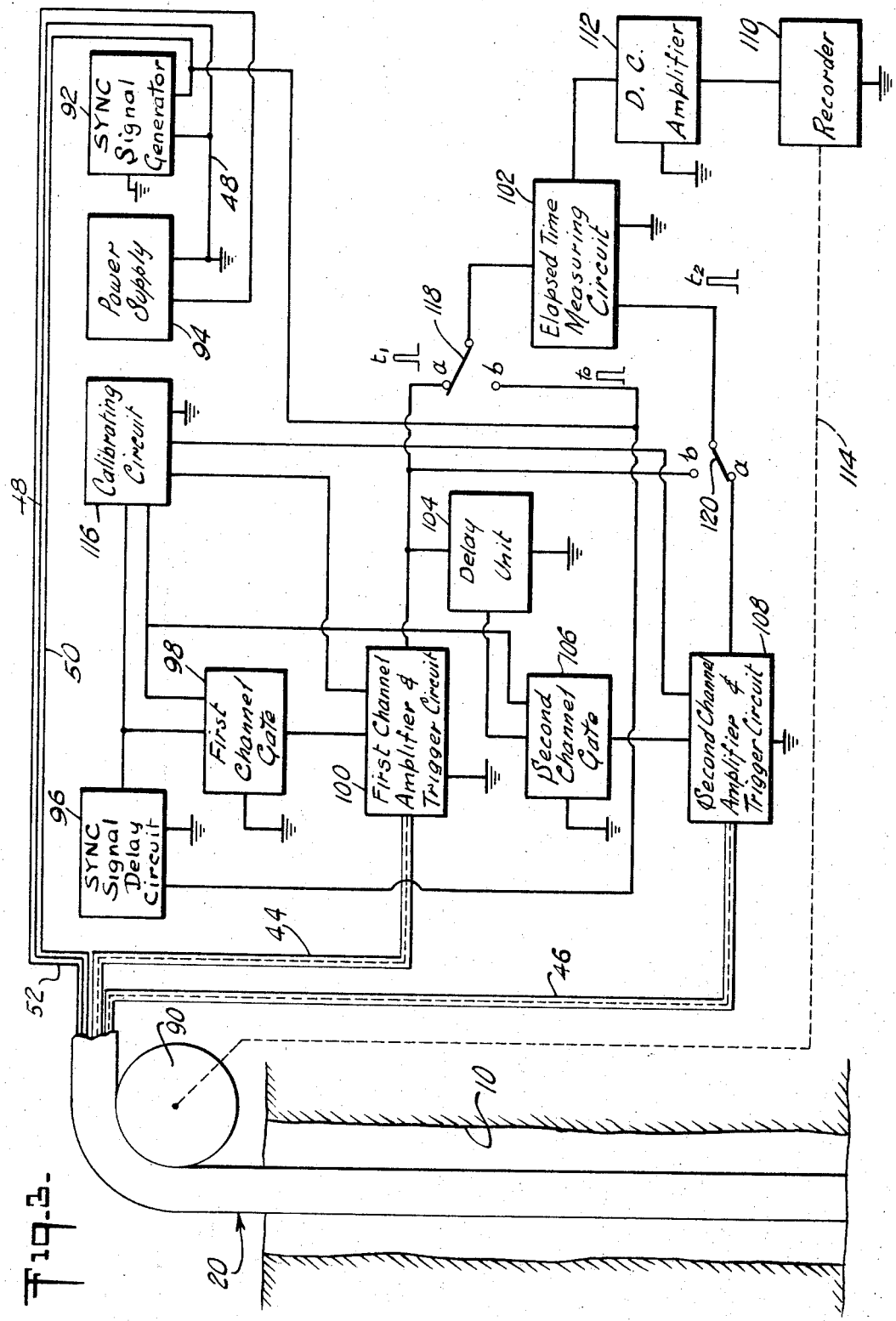

For a better understanding of the invention reference may be had to the accompanying drawing in which:

FIG. 1 illustrates a vertical section through a borehole which contains an exploring unit shown partly broken away to show elements therein, including a schematic representation of the electrical circuitry contained therein in accordance with the present invention, FIG. 2 is an enlarged cross-sectional view of the logging cable through 2—2 of FIG. 1 which is connected to the exploring unit, FIG. 3 is a circuit diagram primarly in block form of the surface equipment of the acoustical system of the present invention icluding a sectional view of a portion of the earth's surface with parts of the apparatus disposed in a borehole therein, FIG. 4 is a circuit diagram of an embodiment of an acoustic pulse generator which may be substituted for the acoustic pulse generator in the exploring unit illustrated in FIG. 1 of the drawing, FIG. 5 is an illustration similar to FIG. 1 but showing the down hole exploring unit and circuitry of another embodiment of the logging system.

Figure 6:
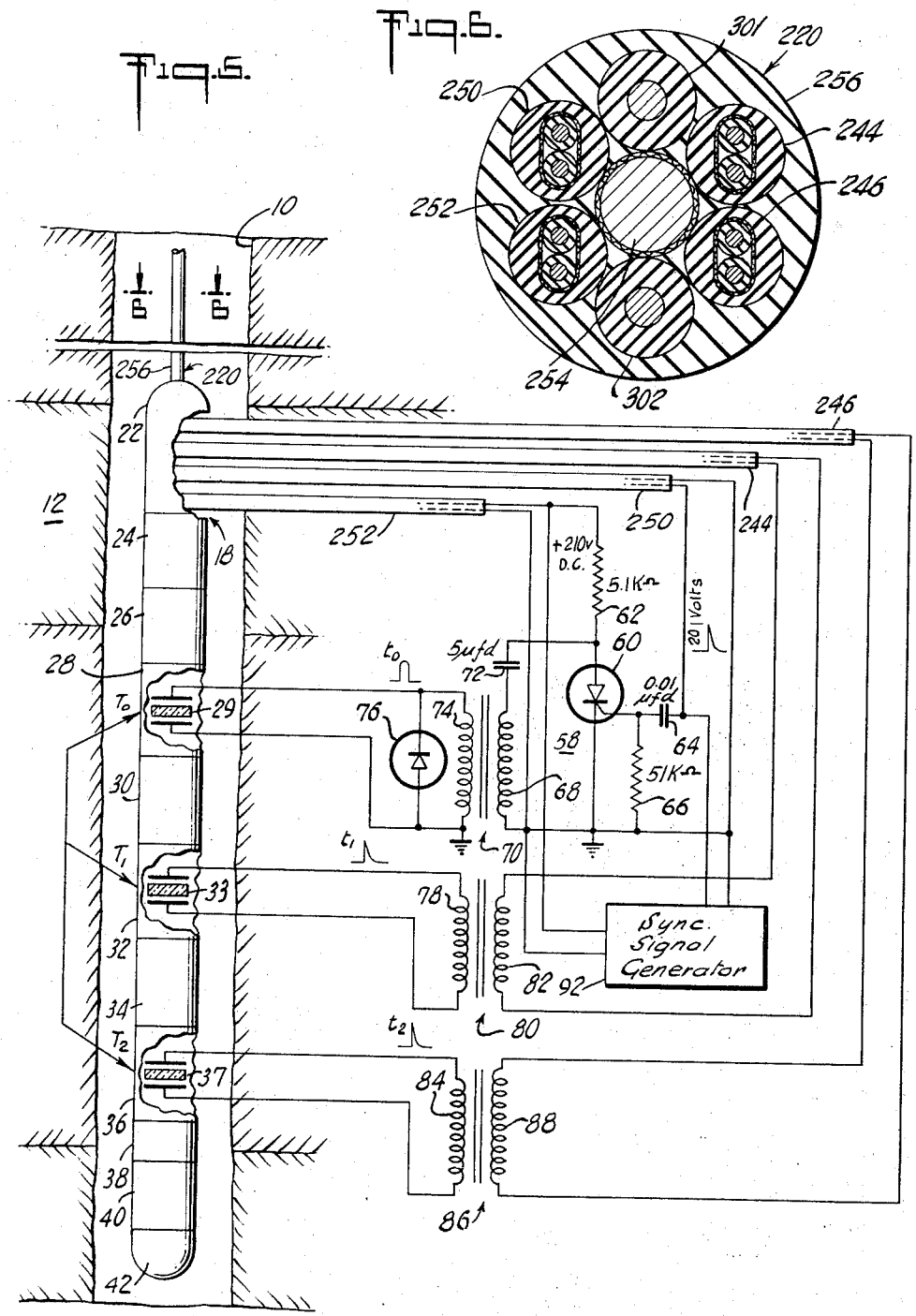
Figure 7:
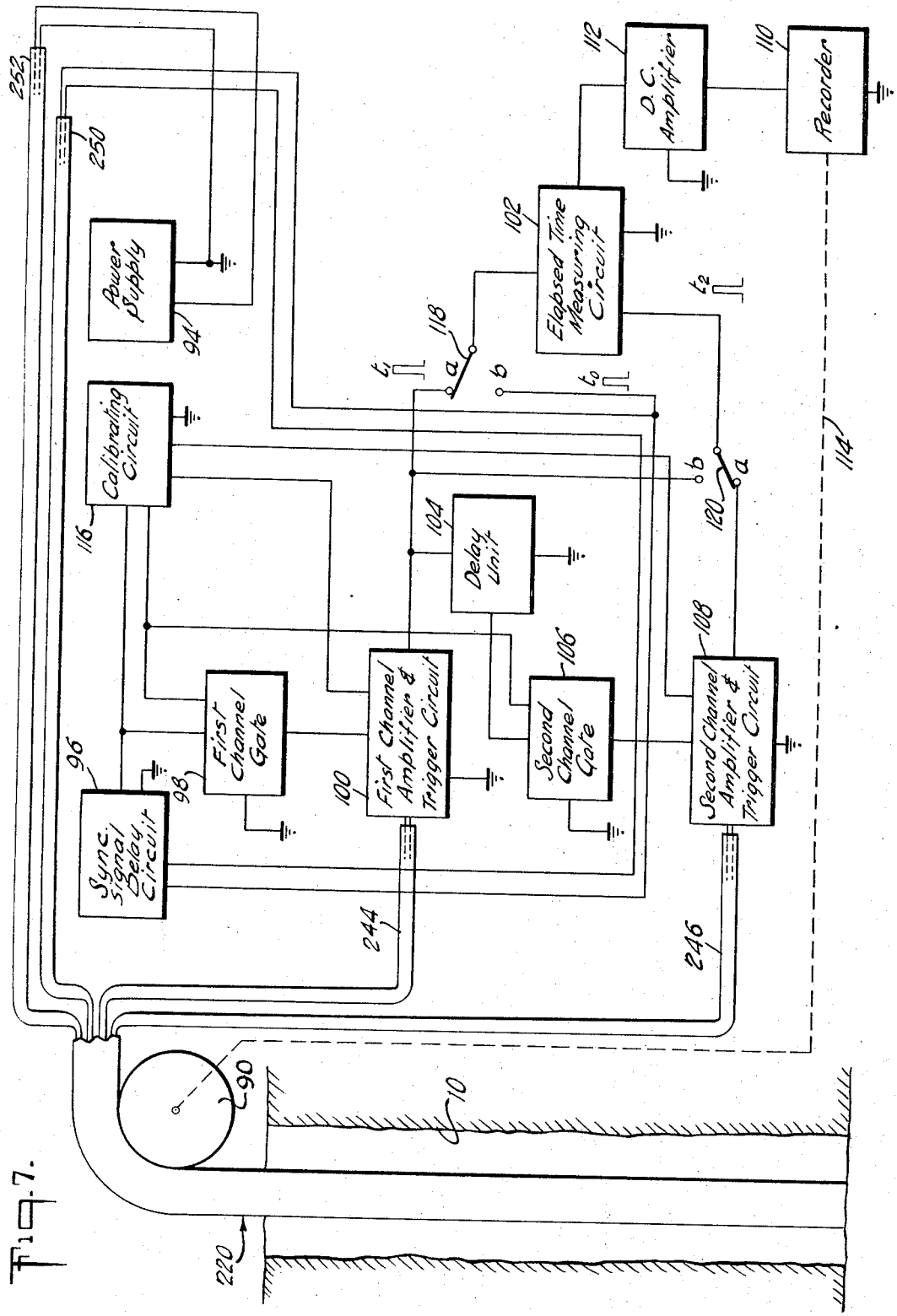

FIG. 6 is an enlarged cross-sectional view taken through the lines 6—6 of FIG. 5, and FIG. 7 is an illustration similar to FIG. 3 showing the surface equipment of the embodiment of FIGS. 5 and 6.

Referring in more detail to the figures of the drawing, a borehole 10 containing a borehole liquid, such as conventionally used borehole drilling mud, is shown traversing a plurality of sub-surface formations 12, 14 and 16, the acoustic velocity in which it is desired to determine. Disposed within the borehole is an exploring unit, sonde or elongated tool 18 supported therein by a multi-conductor cable 20. The exploring unit 18 is made up of a plurality of sections which include, from top to bottom, a packing gland 22, a transmitter circuit housing 24, a first spacer 26, a transmitting transducer 28 which includes a first electrostrictive acoustic element 29, preferably a lead zirconate titanate ceramic cylinder which may have 1.5" length x 1.5" diameter x ⅛" wall thickness dimensions, a second spacer 30, a first receiving transducer 32 spaced, preferably, one foot from the transmitting transducer 28 and which includes a second electrostictive acoustic element 33, preferably, a barium titanate ceramic cylinder, a third spacer 34, a second receiving transducer 36, spaced, preferably, one foot from the first receiving transducer 32 and which includes a third electrostrictive acuostic element 37, preferably, also a barium titanate ceramic cylinder, a fourth spacer 38, a receiver transducer transformer compartment 40 and a boot 42. The spacers 26, 30, 34 and 38 are preferably made of Teflon.

The multiconductor cable 20 provides means for coupling electrical power and signals between the surface equipment and exploring unit of the acoustical system according to the present invention. These signals include appropriate synchronizing signals, hereinafter referred to as sync signals in accordance with common usage in this art. In particular, the cable 20 has first and second coaxial cables 44 and 46, a common ground conductor 48, a sync signal conductor 50, an electrical power conductor 52, a cable spacer 53 and a stainless steel center cable 54, as shown in FIG. 2, and an outer jacket 56. The coaxial cables 44 and 46 are, preferably, miniature coaxial cables such as the Amphenol Subminax coaxial cable No. 21–598 and the stainless steel center cable 54 must be of sufficient strength to support the exploring unit 18 as well as the weight of the cable 20 in the borehole.

An acoustic pulse generator circuit 58, includes a semiconductor device 60 which is a three-terminal solid-state thyratron of the type described in an article entitled "Solid-State Thyratrons Available Today" in the Mar. 6, 1959 issue of Electronics on pages 50 and 51, and preferably a silicon controlled rectifier.

The silicon controlled rectifier 60 is, preferably, a General Electric silicon controlled rectifier type ZJ 39A–250 or type C35H which are PNPN high-power bistable controlled switching devices. The anode of the silicon controlled rectifier 60 is connected to the electrical power conductor 52 through an anode resistor 62. The control element of the silicon controlled rectifier 60 is connected to the sync signal conductor 50 through a coupling capacitor 64. The control element of the silicon controlled rectifier 60 is connected also to ground through a control element resistor 66. The cathode of the silicon controlled rectifier 60 is connected directly to ground. The anode of the silicon controlled rectifier 60 is connected also to one terminal of the primary winding 68 of a step-up transformer 70 through a pulse forming network which is, preferably, a capacitor 72, the other terminal of the primary winding 68 being connected to ground. The secondary winding 74 of the step-up transformer 70 is connected directly across the lead zirconate titanate electrostrictive element 29 and a silicon diode 76 may be connected directly across the secondary winding 74 to serve as damping means for the acoustic pulse generator circuit 58. Very satisfactory results have been obtained when the primary winding 68 of the step-up transformer 70 had 25 turns and the secondary winding 74 and 250 turns.

The first receiving transducer 32 and, more particularly, the first barium titanate electrostrictive element 33, is connected across the primary winding 78 of a second transformer 80. The secondary winding 82 of the second transformer 80 is connected to the first coaxial cable 44. The second receiving transducer 36 and, more particularly, the second barium titanate electrostrictive element 37, is connected across the primary winding 84 of a third transformer 86 which has its secondary winding 88 connected to the second coaxial cable 46.

At the earth's surface the cable 20 passes over a cable measuring device 90. The sync signal conductor 50 and the common ground conductor 48 of the cable 20 are connected to a sync signal generator 92. The sync signal generator 92 may be of a conventional type which produces pulses at a constant repetition rate. A power supply 94 is connected to the electrical power conductor 52 of the cable 20 and it is also connected to the common ground conductor 48. The power supply 94 may be of a conventional design for producing required voltages for the electronic devices in the borehole and in the surface equipment. Since the power supply 94 may be of the conventional type details thereof are not illustrated in the drawings. The sync signal generator 92 is connected also to a sync signal delay circuit 96. The sync signal delay circuit 96 may be a one shot multivibrator followed by a differentiator. The output from the sync signal delay circuit 96 is applied to a first channel gate 98.

The first coaxial cable 44 is connected to a first channel amplifier and trigger circuit 100, the output of which is connected to an elapsed time measuring circuit 102. The first channel gate 98 is connected to the first channel amplifier and trigger circuit 100 so as to render the first channel amplifier and trigger circuit 100 operative during only periods of time in which a signal from the first coaxial cable 44 is expected to be applied thereto. The output from the first channel amplifier and trigger circuit 100 is also applied to a delay unit 104 which may be somewhat similar to the sync signal delay circuit 96. A second channel gate 106 is connected to the output of the delay unit 104.

The input of a second channel amplifier and trigger circuit 108 is connected to the upper end of the second coaxial cable 46 and the output of the second channel amplifier and trigger circuit 108 is connected also to be elapsed time measuring circuit 102. The second channel gate 106 is connected to the second channel amplifier and trigger circuit 108 so as to render the second channel amplifier and trigger circuit 108 operative during only periods of time in which a signal from the second coaxial cable 46 is expected to be applied thereto.

The elapsed time measuring circuit 102 may include a bistable multivibrator responsive to the pulses from the first and second channel amplifier and trigger circuits 100 and 108, a sawtooth generator which is responsive to a voltage wave from the bistable multivibrator and a peak-reading vacuum tube voltmeter, as described in more detail in U.S. Patent 2,931,455, granted Apr. 15, 1960, on the basis of the copending U.S. patent application of R. J. Loofbourrow having Ser. No. 574,844, filed Mar. 29, 1956, which is a continuation application of U.S. application having Ser. No. 157,495, now abandoned. The output from the elapsed time measuring circuit 102 is applied to a conventional recorder 110 through a direct current voltage amplifier 112. The speed or rate of travel of the tape or chart in the recorder 110 is controlled by the cable measuring device 90, which is connected thereto by coupling means 114.

As illustrated in FIG. 3, the surface equipment may include a calibrating circuit 116 which can be made selectively responsive to the output voltage from the sync signal delay circuit 96. The calibrating circuit 116 produces an output signal which is first applied to at least a late stage of the first channel amplifier and trigger circuit 100 and at a known later time to at least a late stage of the second channel amplifier and trigger circuit 108. The calibrating circuit 116 may also have an output connected to the first and second channel gates 98 and 106 to render the first and second channel gates 98 and 106 inoperative, that is, insensitive to the pulses from the first and second coaxial cables, while the calibrating circuit 116 is supplying pulses to the first and second channel amplifier and trigger circuits 100 and 108 to calibrate the elapsed time measuring circuit 102 and the recorder 110.

In operation a pulse of, for example, 20 volts and four microseconds duration, from the sync signal generator 92, is applied to the sync signal conductor 50 of the cable 20 and through the coupling capacitor 64 to the control element of the silicon controlled rectifier 60 of the acoustic pulse generator circuit 58 so as to effectively connect the storage capacitor 72 across the primary winding 68 of the transformer 70. When the capacitor 72 is connected across the primary winding 68 the energy in the capacitor 72 is discharged through the primary winding 68 to produce therein an approximately 100 ampere current surge and thereacross a voltage of the order of −70 volts, and a voltage $t_0$ of the order of +1750 volts and of 13 microseconds duration across the secondary winding 74 of the transformer 70. The silicon diode 76 is connected across the secondary winding 74 so as to effectively ground the negative voltages developed across the secondary winding 74. The positive voltage $t_0$ across the secondary winding 74 is applied to the lead zirconate titanate electrostrictive element 29 to produce an acoustic pulse $T_0$ which passes through the borehole fluids surrounding the exploring unit 18 to the subsurface formations, such as 12, 14 and 16. The positive voltage $t_0$ produces, more accurately, a train of acoustic pulses rather than a single acoustic pulse, however, since measurements are made between the first pulse of each train, reference will be made to an acoustic pulse rather than to a train of pulses. The transmitted acoustic energy from the transmitting transducer 28 of the system of the present invention is increased several times that produced by known well logging acoustic pulse generators utilizing a comparable amount of electrical energy. Furthermore, the acoustic generator of the system of the present invention does not require the use of a high voltage power supply to provide the desired acoustic energy.

A portion of the acoustic energy from the electrostrictive element 29 entering into the subsurface formation is refracted and passes through the formations toward the receiving transducers 32 and 36. A portion $T_1$ of the refracted energy enters into the borehole fluid to strike the first barium titanate electrostrictive element 33 to produce across the electrostrictive element 33 an electric pulse or signal $t_1$ which corresponds to the acoustic energy received at electrostrictive element 33. The electric energy is applied to the first coaxial cable 44 through the second transformer 80. At an instant of time after the acoustic energy is received by the first barium titanate electrostrictive element 33, another portion $T_2$ of the refracted acoustic energy is received at the second barium titanate electrostrictive element 37 to produce thereacross an electric pulse or signal $t_2$ corresponding to the acoustic energy received at the second barium titanate electrostrictive element 37. This electric pulse $t_2$ is applied to the second coaxial cable 46 through the third transformer 86. The second and third transformers 80 and 86 are contained in the receiver transducer transformer compartment 40 which is located a considerable distance from the acoustic pulse generator circuit 58 so as to minimize the possibility of inducing a voltage in the windings of these transformers 80 and 86 by the energy in the acoustic pulse generator circuit 58.

The pulse from the sync signal generator 92, which was applied to the control element of the silicon controlled rectifier 60, is applied also to the sync signal delay circuit 96. The sync signal delay circuit 96 produces a pulse at its output which is delayed by an interval of time which is less than the expected shortest interval of time of travel of an acoustic pulse between the transmitting transducer 28 and the first receiving transducer 32. The first channel gate 98, which is responsive to the pulse produced at the output of the sync signal delay circuit 96, produces at its output a voltage wave or pulse having a time duration which is not less than the time difference between the expected shortest time of travel of an acoustic pulse from the transmitting transducer 28 to the first receiving transducer 32 and the expected longest time of travel of an acoustic pulse from the transmitting transducer 28 to the first receiving transducer 32 through the subsurface formation located between these two transducers. The pulse from the first channel gate 98 is applied to the first channel amplifier and trigger circuit 100 to render this circuit 100 operative only during that time duration. Accordingly, during that time duration the pulse $t_1$ from the first receiving transducer 32, which is being transmitted through the coaxial cable 44, should be received in the first channel amplifier and trigger circuit 100. This pulse $t_1$ will be applied to the first channel amplifier and trigger circuit 100 to be amplified therein and to produce a sharp trigger pulse at the output thereof which is applied to the elapsed time measuring circuit 102 to initiate the measurement of the travel time of the acoustic energy through the subsurface formation between the first and second receiving transducers 32 and 36. The pulse from the output of the first channel amplifier and trigger circuit 100 is applied also to the delay unit 104 which produces at its output a pulse delayed for an interval of time which is less than the expected shortest interval of time of travel of the fastest acoustic pulse through the subsurface formation between the first receiving transducer 32 and the second receiving transducer 36. The pulse from the output of the delay unit 104 is applied to the second channel gate 106 so as to initiate a voltage wave or pulse at the output of the second channel gate 106 having a time duration which is not less than the difference in time between the arrival of the earliest expected acoustic pulse and the last expected acoustic pulse at the second receiving transducer 36 which passes through the subsurface formation between the first and second receiving transducers 32 and 36. The pulse from the output of the second channel gate 106 is applied to the second channel amplifier and trigger circuit 108 to render this circuit 108 operative only during the interval of time when the pulse from the second channel gate 106 is being applied thereto. Accordingly, the electrical pulse $t_2$ from the second barium titanate electrostrictive element 37 which is transmitted through the second coaxial cable 46 should arrive at the second channel amplifier and trigger circuit 108 during this interval of time to be amplified therein and to produce a sharp trigger pulse at the output of this circuit 108 which is applied to the elapsed time measuring circuit 102 to terminate the operation of the elapsed time measuring circuit 102. The output from the elapsed time measuring circuit 102 is then amplified by the direct current voltage amplifier 112 and recorded in the recorder 110.

When it is desired to calibrate the elapsed time measuring circuit 102 and the recorder 110, the calibrating circuit 116 may be energized to produce a bias voltage which is applied to the first and second channel gates 98 and 106 to render these gates 98 and 106 inoperative during the period of time in which calibrating pulses from the calibrating circuit 116 are being transmitted from the output of the calibrating circuit 116 to the elapsed time measuring circuit 102. The calibrating circuit 116 may include a one shot multivibrator that is actuated by the pulse from the sync signal delay circuit 96 to produce a square voltage wave having a time duration which is equal to the time of travel of an acoustic pulse of a given velocity between the first and second receiving transducers 32 and 36. From this square voltage wave a pair of pulses may be obtained, in any known manner, which are separated in time by the duration of the square wave. The first pulse of this pair of pulses is applied to at least a portion of the first channel amplifier and trigger circuit 100 to produce at the output thereof a trigger pulse which is applied to the elapsed time measuring circuit 102. The second pulse of this pair of pulses is applied to at least a portion of the second channel amplifier and trigger circuit 108 to produce a sharp trigger pulse at the output thereof which is applied to the elapsed time measuring circuit 102. If desired, the calibrating circuit 116 may include a combination switch which can turn off the channel gates 98 and 106 and turn on the calibrating circuit 116.

FIG. 4 illustrates another embodiment of an acoustic pulse generator which may be substituted for and which, in general, is similar to the acoustic pulse generator 58 illustrated in FIG. 1. In this embodiment of the generator, the sync signal conductor 50 of the cable 20 is connected to the control element of a silicon controlled rectifier 60' through a resistor 122 and a first diode 124, having its cathode connected to the control element of the controlled rectifier 60'. A second diode 126 is connected between the control element and the cathode of the silicon controlled rectifier 60', the cathode of the second diode 126 being connected to the control element of the controlled rectifier 60'. The electrical power conductor 52 of the cable 20 is connected to the anode of the silicon controlled rectifier 60' through an anode resistor 128. A third diode 130 is connected across the output of the silicon controlled rectifier 60', the cathode of the third diode 130 being connected to the anode of the controlled rectifier 60'. Connected, also across the output of the silicon controlled rectifier 60' is the series combination of a storage capacitor 132 and a primary winding 134 of a step-up transformer 136. A secondary winding 138 of the transformer 136 is connected across the transmitting transducer 28. A pair of serially connected diodes 140 and 142 is connected also across the transmitting transducer 28, the anode of one diode 140 of the pair of diodes being connected directly to ground, or the common ground conductor 48, and the anode of the other diode 142 of the pair of didoes being connected to ground through the one diode 140.

In one embodiment of applicants' invention as shown in FIG. 4, the silicon controlled rectifier 60 may be a type C35H, the first diode 124 may be a type IN645, the second diode 126 may be a type IN645, the third diode 130 may be a type IN1125R and the pair of serially connected didoes 140 and 142 may each be a type IN1131. With a B+ source of +210 volts the anode resistor 128 may have a value of 1,000 ohms. The input resistor 122 may have a value of 200 ohms. The storage capacitor 132 may have a value of 5 microfarads. The primary winding 134 of transformer 136 may appropriately have 25 turns and the secondary winding 138 may have 250 turns.

Accordingly, it can be seen that an improved acoustical velocity well logging system has been provided which has in its exploring unit a minimum of electrical components and which does not include a single electronic tube.

Of course, it should be understood that the surface equipment may include vacuum tube amplifiers and power supplies but if desired, the circuitry may include transistors and, accordingly, require less power and be more portable.

Thus, it can be seen that the acoustical velocity logging system of the present invention has provided advantages of improved performance, ease of field operation, more ruggedness due to absence of electronic vacuum tubes, less expense in fabrication costs, and being more readily accepted by field personnel because the loss of the exploring unit of the present invention, for example, in a seismic shothole, would not be reflected as such an undesirable technical and economic problem as would the loss of presently used exploring units. The cost of constructing the exploring unit of the present invention has been found to be less than one-fourth of the cost of constructing the most inexpensive exploring unit of any known acoustical velocity well logging system used heretofore.

Although a system employing an exploring unit having two receiving transducers has been shown, it should be understood that an exploring unit having only one receiving transducer may be employed, time measurements being made between pulses $t_0$ and $t_1$ by employing switches 118 and 120, as illustrated in FIG. 3 of the drawings, to disconnect each contact point $a$ from and to electrically connect each contact point $b$ to the elapsed time measuring circuit 102.

The further embodiment illustrated in FIGS. 5, 6 and 7 is substantially identical with the embodiments illustrated in FIGS. 1 through 4, with the exception that the cable 220 of FIGS. 5, 6 and 7 differs somewhat from the cable 20 of FIGS. 1, 2 and 3 and with the further exception that the sync signal generator 92 is located in the down hole logging unit 22 rather than with the surface equipment as shown in FIG. 3 of the previously described embodiment.

In the system of FIGS. 5, 6 and 7, the logging cable 220, particularly as shown in detail in FIG. 6, comprises four twisted conductor pairs 244, 246, 250 and 252. Each of the conductor pairs consist of two copper conductors twisted about one another along the cable, with each conductor of the respective pairs being individually provided with a surrounding sleeve of insulating material such as Teflon having good insulating properties under the conditions of temperature and pressure encountered in bore holes which may be 5000 or more feet in depth. Each twisted pair of insulated conductors is enclosed within an electrical shield advantageously comprising a braided copper sheath which, in turn, is enclosed within an insulating jacket preferably formed of material such as nylon which serves to insulate the respective shields from one another and from the rest of the cable. In addition to the four thus described twisted pairs of conductors the cable 220 is provided with first and second individual conductive wire members 301 and 302 each of which is advantageously constructed of stranded copper wires enclosed within an insulating material such as polyethylene. The cable 220 further comprises a centrally disposed steel supporting cable stress member 254 advantageously in the form of a stainless steel stranded cable of sufficient strength to support the logging unit 22 and the portion of the cable 220 suspended in the bore hole. The stress member 254 is wrapped in adhesive tape which serves to reduce the likelihood of abrasive damage to the insulation of the surrounding conductors. The four twisted conductor pairs each with its respective electrical shield and nylon jacket are disposed along with the individual conductors 301 and 302 in symmetrical relationship in generally tangential mating contact around the centrally located stress member 254. The cable 220 is further provided with a wrapping of fiberglass and an outer fluid-tight jacket 256 advantageously formed of rubber-like material of the synthetic type such as polyvinyl material having the required flexibility resistant to bore hole fluids and conditions of temperature, pressure and abrasion. The interstices within the outer cable jacket 256 are filled with a suitable cable core filler material in a manner known in the art.

The twisted conductor pair 244 (conductor pair number 1) couples the output of the first receiver 33 in the borehole logging unit to the first channel amplifier and trigger circuit 100 at the surface.

The twisted conductor pair 246 (conductor pair number 2) couples the output of the second receiver unit 37 in the borehole logging unit to the second channel amplifier and trigger circuit 108 at the surface.

The conductor pair 252 connects the power supply 94 at the surface to the acoustic transmitter pulsing circuit 58 and sync signal generator 92, both of which are located in the downhole logging unit.

The twisted conductor pair 250 (conductor pair number 4) couples the output of the sync signal generator 92 in the downhole logging unit to the sync signal delay circuit 96 at the surface.

It is noted that the sync signal generator 92 in the downhole logging unit of FIG. 5 is shown provided with a single pair of output leads connected to the downhole end of the twisted pair of conductors 250 (conductor pair number 4) and to the acoustic transmitter pulsing circuit 58. In accordance with a further embodiment of the invention (not illustrated) it is understood that the sync signal generator 92 may include two separate output channels one of which is connected to the pulsing network and the other of which is connected to the conductor pair 250 for transmission of the sync signal to the surface equipment. By thus providing separate and distinct output circuit paths from the sync signal generator 92 to the pulsing circuit 58 and to the conductor pair 250 a relatively sharp sync pulse can be transmitted over the conductor pair 250 without the influence of after pulse ringing or dead time effects that may follow activation of the pulsing circuit 58.

At the surface end of the transmission system comprising cable 220, the shield of each conductor pair is left in a floating or non-connected condition, i.e., there is no connection provided between the shield associated with the respective twisted pairs and the conductors of the respective pairs or with ground. In the downhole logging instrument 22 of the apparatus shown in FIG. 5, it is to be understood that one of the two conductors of each of the four twisted pairs is connected (not illustrated) to its respective copper braided shield. In the downhole logging instrument 22 of FIG. 5 neither of the individual conductors of each of the first and second twisted pairs 244 and 246 are connected to common ground. However, one of the conductors of the twisted pair 250 and one of the conductors of the twisted pairs 252 are connected to common ground as illustrated in FIG. 5. Although not shown in the drawings, the conductive sheath or shield of the pair 252 is connected to the grounded one of the pair 252. Likewise the conductive sheath of the twisted pair 250 is connected to the grounded conductor of the pair 250.

The individual conductors 301 and 302 are not specifically illustrated in FIGS. 5–7 since they are not necessary to the operation of the disclosed apparatus. Individual conductors 301 and 302 of the cable 220 serve the purpose of spacers in the cable and are available for use in conducting other logging functions such as electric logging functions not illustrated in the figures of the drawings and which are not directly concerned with the disclosed invention.

It is to be understood that the elements of FIGS. 5, 6 and 7 not specifically described correspond to the elements bearing corresponding reference numbers in FIGS. 1–4.

Obviously many modifications and variations of the invention, as hereinbefore set forth, may be made without departing from the spirit and scope thereof, and therefore only such limitations should be imposed as are indicated in the appended claims.

We claim:

1. An acoustical velocity well logging system comprising an elongated tool adapted to be passed through the bore of a well, an acoustic pulse generating circuit including a first electroacoustical transducer supported by said tool and adapted to produce an acoustic pulse for travel through a subsurface formation opposite said tool between two spaced apart points on said tool and means for actuating said transducer including trigger pulse producing means, a first transformer having an output operatively coupled to said transducer, a pulse forming network operatively coupled to an input of said first transformer, means for electrically charging said network, means for discharging the energy in said pulse-forming network through said first transformer to said first transducer comprising a silicon controlled rectifier having an anode-cathode output circuit and an input circuit including a control element, said controlled rectifier input circuit being operatively coupled to said trigger pulse-producing means, said controlled rectifier output circuit being operatively coupled to said pulse forming network and to said transformer to discharge the energy in said pulse forming network into said transformer upon the arrival thereat of a pulse from said trigger pulse producing means, and means for measuring the time of travel of said acoustic pulse between said two points, said measuring means including a second electroacoustical transducer supported by said tool at a fixed distance from said first transducer and responsive to said acoustic pulse and a coaxial cable operatively coupled to said second transducer to transmit the output thereof to the earth's surface and apparatus at the earth's surface operatively coupled to said coaxial cable for providing a signal indication proportional to the time of travel of said acoustic pulse between said two points as a measure of the velocity of said acoustic pulse travelling through the subsurface formation opposite said tool.

2. An acoustical velocity well logging system set forth in claim 1 wherein said measuring means further includes a second transformer coupling the output from said second transducer to said cable and said tool includes a first housing disposed at one end thereof to house said first transformer, said pulse forming network and said silicon controlled rectifier and a second housing disposed at the opposite end thereof to house said second transformer, said first electroacoustical transducer being disposed between said second housing and said one end of said tool.

3. An acoustical velocity well logging system comprising an elongated tool adapted to be passed through the bore of a well, means for transmitting an acoustic pulse through earth formations including an acoustical transmitting transducer, an acoustic pulse generating circuit including said acoustical transmitting transducer, a first transformer having a primary winding and a secondary winding coupled to said transducer, a pulse forming network and a silicon controlled rectifier disposed within said tool at the upper end thereof, means for electrically charging said network, said silicon controlled rectifier having an output circuit and an input circuit including a control element, means for periodically discharging said pulse-forming network through the primary winding of said first transformer including a trigger pulse producing means disposed at the earth's surface and coupled to the control element of said silicon controlled rectifier, the output of said silicon controlled rectifier being operatively connected to said pulse forming network and to said primary winding so as to periodically couple said pulse forming network to the primary winding of said transformer, means for detecting an acoustic pulse transmitted through earth formations from said acoustic transmitting transducer comprising first and second acoustic pulse receiving transducers longitudinally spaced apart from each other and from said transmitting transducer, first and second coaxial cables, means including a second transformer for coupling said first receiving transducer to one end of said first coaxial cable, means including a third transformer for coupling said second receiving transducer to one end of said second coaxial cable, said first and second receiving transducers and said second and third transformers being disposed in said tool at the lower end thereof, and time measuring means coupled to the other end of said first and second coaxial cables for providing an indication of the time interval between the detection of an acoustic pulse by said first and second acoustic pulse receiving transducers.

4. An acoustical velocity well logging system comprising an elongated housing adapted to be passed through the bore of a well, means including an acoustical transmitting transducer for transmitting an acoustic pulse through earth formations, an acoustic pulse generating circuit including said acoustical transmitting transducer, a first transformer having a primary winding and a secondary winding coupled to said transducer, energy storing means and a silicon controlled rectifier disposed within said housing at the upper end thereof, said controlled rectifier having an output circuit and an input circuit including a control element, trigger pulse producing means disposed at the earth's surface, means for applying the output from said trigger pulse producing means to the control element of said silicon controlled rectifier and means for supplying energy to said energy storing means, means including the output circuit of said silicon controlled rectifier for periodically discharging the energy in said storing means through the primary winding of said first transformer, means for detecting an acoustic pulse transmitted through earth formations from said acoustical transmitting transducer comprising first and second acoustic pulse receiving transducers longitudinally spaced apart from each other and from said transmitting transducer, first and second coaxial cables, means including a second transformer for coupling said first receiving transducer to second receiving transducers and said second and third transformer for coupling said second receiving transducer to one end of said second coaxial cable, said first and second receiving transducers and said second and third transformers being disposed in said housing at the lower end thereof, and time measuring means coupled to the other end of said first and second coaxial cables for providing an indication of the time interval between the detection of an acoustic pulse by said first and second acoustic pulse receiving transducers.

5. An acoustical velocity well logging system comprising an elongated tool adapted to be passed through the bore of a well, an acoustic pulse generating circuit including a first electroacoustical transducer and a semiconductor device of the solid-state thyratron type for producing an acoustic pulse at periodic intervals, a transformer having a primary and a secondary winding, the secondary winding of said transformer being coupled to said first electroacoustical transducer, said semi-conductor device having an output circuit and an input circuit, an electrical energy storing network, means for charging said energy storing network, means including the output circuit of said semi-conductor device for discharging said network through the primary winding of said transformer, a second electroacoustical transducer, said first and second electroacoustical transducers being at a fixed spaced apart distance from each other and supported by said tool, a coaxial cable, means for applying the output from said second transducer to one end of said coaxial cable and means coupled to said acoustic pulse generating circuit and to the other end of said coaxial cable for measuring the time of travel of one of the acoustic pulses between said first and second transducers.

6. An acoustical velocity well logging system comprising an elongated tool adapted to be passed through the bore of a well, an acoustic pulse generating circuit including a first electroacoustical transducer supported by said tool and adapted to produce an acoustical pulse for travel through a subsurface formation opposite said tool between two spaced apart points on said tool and means for actuating said transducer including trigger pulse producing means, a first transformer having an output operatively coupled to said transducer, a pulse forming network operatively coupled to an input of said first transformer, means for electrically charging said network, means for discharging the energy in said pulse-forming network through said first transformer to said first transducer comprising a silicon controlled rectifier having an anode-cathode output circuit and an input circuit including a control element, said controlled rectifier input circuit being operatively coupled to said trigger pulse-producing means, said controlled rectifier output circuit being operatively coupled to said pulse forming network and to said transformer to discharge the energy in said pulse forming network into said transformer upon the arrival thereat of a pulse from said trigger pulse producing means, and means for measuring the time of travel of said acoustic pulse between said two points, said measuring means including a second electroacoustical transducer supported by said tool at a fixed distance from said first transducer and responsive to said acoustic pulse and a signal transmission system operatively coupled to said second transducer to transmit the output thereof to the earth's surface and apparatus at the earth's surface operatively coupled to said signal transmission system for providing a signal indication proportional to the time of travel of said acoustic pulse between said two points as a measure of the velocity of said acoustic pulse travelling through the subsurface formation opposite said tool, said apparatus further including a second transformer directly coupling said second transducer to said signal transmission system.

7. An acoustical velocity well logging system set forth in claim 6 wherein said measuring means further includes a third transducer and a third transformer directly coupling the output from said second third transducer to said signal transmission system and said tool includes a first housing disposed at one end thereof to house said first transformer, said pulse forming network and said silicon controlled rectifier and a second housing disposed at the opposite end thereof to house said second transformer, said first electroacoustical transducer being disposed between said second housing and said one end of said tool.

8. An acoustical velocity well logging system comprising an elongated tool adapted to be passed through the bore of a well, means for transmitting an acoustic pulse through earth formations including an acoustical transmitting transducer, an acoustic pulse generating circuit including said acoustical transmitting transducer, a first transformer having a primary winding and a secondary winding coupled to said transducer, a pulse forming network and a silicon controlled rectifier disposed within said tool at the upper end thereof, means for electrically charging said network, said silicon controlled rectifier having an output circuit and an input circuit including a control element, means for periodically discharging said pulse-forming network through the primary winding of said first transformer including a trigger pulse producing means coupled to the control element of said silicon controlled rectifier, the output of said silicon controlled rectifier being operatively connected to said pulse forming network and to said primary winding so as to periodically couple said pulse forming network to the primary winding of said transformer, means for detecting an acoustic pulse transmitted through earth formations from said acoustic transmitting transducer comprising first and second acoustic pulse receiving transducers longitudinally spaced apart from each other and from said transmitting transducer, a signal transmission system comprising first and second transmission circuits, means including a second transformer for directly coupling said first receiving transducer to one end of said first transmission circuit, means including a third transformer for directly coupling said second receiving transducer to one end of said second transmission circuit, said first and second receiving transducers and said second and third transformers being disposed in said tool at the lower end thereof, and time measuring means coupled to the other end of said first and second transmission circuits for providing an indication of the time interval between the detection of an acoustic pulse by said first and second acoustic pulse receiving transducers.

9. An acoustical velocity well logging system comprising an elongated tool adapted to be passed through the bore of a well, an acoustic pulse generating circuit including a first electroacoustical transducer and a semiconductor device of the solid-state thyratron type for producing an acoustic pulse at periodic intervals, a first transformer having a primary and a secondary winding, the secondary winding of said transformer being coupled to said first electroacoustical transducer, said semi-conductor device having an output circuit and an input circuit, an electrical energy storing network, means for charging said energy storing network, means including the output circuit of said semi-conductor device for discharging said network through the primary winding of said transformer, second and third electroacoustical transducers, said second and third electroacoustical transducers being spaced from said first transducer and being at a fixed spaced apart distance from each other and supported by said tool, a signal transmission system, means including second and third transformer for applying the respective outputs from said second and third transducers directly to one end of said signal transmission system and means coupled to the other end of said signal transmission system for measuring the time of travel of one of the acoustic pulses between said second and third transducers.

10. An acoustical velocity well logging system comprising an elongated tool adapted to be passed through the bore of a well, an acoustic pulse generating circuit including a first electroacoustical transducer and a device for producing an acoustic pulse at periodic intervals, a first transformer having a primary and a secondary winding, the secondary winding of said transformer being coupled to said first electroacoustical transducer, said device having an output circuit and an input circuit, an electrical energy storing network, means for charging said energy storing network, means including the output circuit of said device for discharging said network through the primary winding of said first transformer, a second and a third electroacoustical transducer, said second and third electroacoustical transducers being at a fixed spaced apart distance from each other and from said first transducer and being supported by said tool, a signal transmission system, means including the second and third transformers, for applying the respective outputs directly from said second and third transducers to one end of said signal transmission system and means coupled to said acoustic pulse generating circuit and to the other end of said signal transmission system for measuring the time of travel of one of the acoustic pulses between said second and third transducers.

11. An acoustical velocity well logging system comprising an elongated housing adapted to be passed through the bore of a well, means including an acoustical transmitting transducer for transmitting an acoustic pulse through earth formations, an acoustic pulse generating circuit including said acoustical transmitting transducer, a first transformer having a primary winding and a secondary winding coupled to said transducer, energy storing means and a silicon controlled rectifier disposed within said housing at the upper end thereof, said controlled rectifier having an output circuit and an input circuit including a control element, trigger pulse producing means, for applying the output from said trigger pulse producing means to the control element of said silicon controlled rectifier and means for supplying energy to said energy storing means, means including the output circuit of said silicon controlled rectifier for periodically discharging the energy in said storing means through the primary winding of said first transformer, means for detecting an acoustic pulse transmitted through earth formations from said acoustical transmitting transducers comprising first and second acoustic pulse receiving transducers longitudinally spaced apart from each other and from said transmitting transducer, means defining first and second signal transmission paths, means including a second transformer for coupling said first receiving transducer to one end of the means defining said first signal path, means including a third transformer for coupling said second receiving transducer to one end of the means defining said second signal path, said first and second receiving transducers and said second and third transformers being disposed in said housing at the lower end thereof, and time measuring means coupled to the other end of the means defining said first and second signal paths for providing an indication of the time interval between the detection of an acoustic pulse by said first and second acoustic pulse receiving transducers.

12. An acoustical velocity well logging system comprising an elongated tool adapted to be passed through the bore of a well, an acoustic pulse generating circuit including a first electroacoustical transducer supported by said tool and adapted to produce an acoustic pulse for travel through a subsurface formation opposite said tool between two spaced apart points on said tool and means for actuating said transducer including trigger pulse producing means, a first transformer having an output operatively coupled to said transducer, a pulse forming network operatively coupled to an input of said first transformer, means for electrically charging said network, means for discharging the energy in said pulse-forming network through said first transformer to said first transducer comprising a silicon controlled rectifier having an anode-cathode output circuit and an input circuit including a control element, said controlled rectifier input circuit being operatively coupled to said trigger pulse-producing means, said controlled rectifier output circuit being operatively coupled to said pulse forming network and to said transformer to discharge the energy in said pulse forming network into said transformer upon the arrival thereat of a pulse from said trigger pulse producing means, and means for measuring the time of travel of said acoustic pulse between said two points, said measuring means including a second electroacoustical transducer supported by said tool at a fixed distance from said first transducer and responsive to said acoustic pulse and a coaxial cable operatively coupled to said second transducer to transmit the output thereof to the earth's surface and apparatus at the earth's surface operatively coupled to said coaxial cable for providing a signal indication proportional to the time of travel of said acoustic pulse between said two points as a measure of the velocity of said acoustic pulse travelling through the subsurface formation opposite said tool, and wherein said tranrformer is a step-up transformer and said acoustic pulse generating circuit further includes rectifying means connected across the ouput of said transformer.

13. An acoustical velocity well logging system comprising an elongated tool adapted to be passed through the bore of a well, an acoustic pulse generating circuit including a first electroacoustical transducer supported by said tool and adapted to produce an acoustic pulse for travel through a subsurface formation opposite said tool between two spaced apart points on said tool and means for actuating said transducer including trigger pulse producing means, a first transformer having an output operatively coupled to said transducer, a pulse forming network operatively coupled to an input of said first transformer, means for electrically charging said network, means for discharging the energy in said pulseforming network through said first transformer to said first transducer comprising a silicon controlled rectifier having an anode-cathode output circuit and an input circuit including a control element, said controlled rectifier input circuit being operatively coupled to said trigger pulse-producing means, said controlled rectifier output circuit being operatively coupled to said pulse forming network and to said transformer to discharge the energy in said pulse forming network into said transformer upon the arrival thereat of a pulse from said trigger pulse producing means, and means for measuring the time of travel of said acoustic pulse between said two points, said measuring means including a second electroacoustical transducer supported by said tool at a fixed distance from said first transducer and responsive to said acoustic pulse and a coaxial cable operatively coupled to said second transducer to transmit the output thereof to the earth's surface and apparatus at the earth's surface operatively coupled to said coaxial cable for providing a signal indication proportional to the time of travel of said acoustic pulse between said two points as a measure of the velocity of said acoustic pulse travelling through the subsurface formation opposite said tool, and wherein said acoustic pulse generating circuit further includes rectifying means connected in parallel with the anode-cathode circuit of said silicon controlled rectifier.

14. An acoustical velocity well logging system comprising an elongated tool adapted to be passed through the bore of a wall, an acoustic pulse generating circuit including a first electroacoustical transducer supported by said tool and adapted to produce an acoustic pulse for travel through a subsurface formation opposite said tool between two spaced apart points on said tool and means for actuating said transducer including trigger pulse producing means, a first transformer having an output operatively coupled to said transducer, a pulse forming network operatively coupled to an input of said first transformer, means for electrically charging said network, means for discharging the energy in said pulse-forming network through said first transformer to said first transducer comprising a silicon controlled rectifier having an anode-cathode output circuit and an input circuit including a control element, said controlled rectifier input circuit being operatively coupled to said trigger pulse-producing means, said controlled rectifier output circuit being operatively coupled to said pulse forming network and to said transformer to discharge the energy in said pulse forming network into said transformer upon the arrival thereat of a pulse from said trigger pulse producing means, and means for measuring the time of travel of said acoustic pulse between said two points, said measuring means including a second electroacoustical transducer supported by said tool at a fixed distance from said first transducer and responsive to said acoustic pulse and a coaxial cable operatively coupled to said second transducer to transmit the output thereof to the earth's surface and apparatus at the earth's surface operatively coupled to said coaxial cable for providing a signal indication proportional to the time of travel of said acoustic pulse between said two points as a measure of the velocity of said acoustic pulse travelling through the subsurface formation opposite said tool, and wherein the trigger pulse producing means of said acoustic pulse generator includes a first diode connected to the control element of said silicon controlled rectifier so as to readily pass the trigger pulse therethrough to said control element and a second diode connected between the control element of said silicon controlled rectifier and a point of ground potential so as to provide a high impedance path for the trigger pulse.

15. An acoustical velocity well logging system comprising an elongated tool adapted to be passed through the bore of a well, an acoustic pulse generating circuit including a first electroacoustical transducer supported by said tool and adapted to produce an acoustical pulse for travel through a subsurface formation opposite said tool between two spaced apart points on said tool and means for actuating said transducer including trigger pulse producing means, a first transformer having an output operatively coupled to said transducer, a pulse forming network operatively coupled to an input of said first transformer, means for electrically charging said network, means for discharging the energy in said pulse-forming network through said first transformer to said first transducer comprising a silicon controlled rectifier having an anode-cathode output circuit and an input circuit including a control element, said controlled rectifier input circuit being operatively coupled to said trigger pulse-producing means, said controlled rectifier output circuit being operatively coupled to said pulse forming network and to said transformer to discharge the energy in said pulse forming network into said transformer upon the arrival thereat of a pulse from said trigger pulse producing means, and means for measuring the time of travel of said acoustic pulse between said two points, said measuring means including a second electroacoustical transducer supported by said tool at a fixed distance from said first transducer and responsive to said acoustic pulse and a signal transmission system operatively coupled to said second transducer to transmit the output thereof to the earth's surface and apparatus at the earth's surface operatively coupled to said signal transmission system for providing a signal indication proportional to the time of travel of said acoustic pulse between said two points as a measure of the velocity of said acoustic pulse traveling through the subsurface formation opposite said tool, and wherein said transformer is a step-up transformer and said acoustic pulse generating circuit further includes rectifying means connected across the output of said transformer.

16. An acoustical velocity well logging system comprising an elongated tool adapted to be passed through the bore of a well, an acoustic pulse generating circuit including a first electroacoustical transducer supported by said tool and adapted to produce an acoustical pulse for travel through a subsurface formation opposite said tool between two spaced apart points on said tool and means for actuating said tranducer including trigger pulse producing means, a first transformer having an output operatively coupled to said transducer, a pulse forming network operatively coupled to an input of said first transformer, means for electrically charging said network, mans for discharging the energy in said pulse-forming network through said first transformer to said first transducer comprising a silicon controlled rectifier having an anode-cathode output circuit and an input circuit including a control element, said controlled rectifier input circuit being operatively coupled to said trigger pulse-producing means, said controlled rectifier output circuit being operatively coupled to said pulse forming network and to said transformer to discharge the energy in said pulse forming network into said transformer upon the arrival thereat of a pulse from said trigger pulse producing means, and means for measuring the time of travel of said acoustic pulse between said two points, said measuring means including a second electroacoustical transducer supported by said tool at a fixed distance from said first transducer and responsive to said acoustic pulse and a signal transmission system operatively coupled to said second transducer to transmit the output thereof to the earth's surface and apparatus at the earth's surface operatively coupled to said signal transmission system for providing a signal indication proportional to the time of travel of said acoustic pulse between said two points as a measure of the velocity of said acoustic pulse travelling through the subsurface formation opposite said tool, and wherein said acoustic pulse generating circuit further includes rectifying means connected in parallel with the anode-cathode circuit of said silicon controlled rectifier.

17. An acoustical velocity well logging system comprising an elongated tool adapted to be passed through the bore of a well, an acoustic pulse generating circuit including a first electroacoustical transducer supported by said tool and adapted to produce an acoustical pulse for travel through a subsurface formation opposite said tool between two spaced apart points on said tool and means for actuating said transducer including trigger pulse producing means, a first transformer having an output operatively coupled to said transducer, a pulse forming network operatively coupled to an input of said first transformer, means for electrically charging said network, means for discharging the energy in said pulse-forming network through said first transformer to said first transducer comprising a silicon controlled rectifier having an anode-cathode output circuit and an input circuit including a control element, said controlled rectifier input circuit being operatively coupled to said trigger pulse-producing means, said controlled rectifier output circuit being operatively coupled to said pulse forming network and to said transformer to discharge the energy in said pulse forming network into said transformer upon the arrival thereat of a pulse from said trigger pulse producing means, and means for measuring the time of travel of said acoustic pulse between said two points, said measuring means including a second electroacoustical transducer supported by said tool at a fixed distance from said first transducer and responsive to said acoustic pulse and a signal transmission system operatively coupled to said second transducer to transmit the output thereof to the earth's surface and apparatus at the earth's surface operatively coupled to said signal transmission system for providing a signal indication proportional to the time of travel of said acoustic pulse between said two points as a measure of the velocity of said acoustic pulse travelling through the subsurface formation opposite said tool, and wherein the trigger pulse producing means of said acoustic pulse generator includes a first diode connected to the control element of said silicon controlled rectifier so as to readily pass the trigger pulse therethrough to said control element and a second diode connected between the control element of said silicon controlled rectifier and a point of ground potential so as to provide a high impedance path for the trigger pulse.

References Cited

UNITED STATES PATENTS

| | | | |
|---|---|---|---|
| 2,938,592 | 5/1960 | Charske et al. | 181—.5 |
| 2,949,973 | 8/1960 | Broding et al. | 181—.5 |
| 3,112,466 | 11/1963 | Engle et al. | 340—18 |
| 3,113,289 | 12/1963 | Brokaw | 340—18 |
| 3,191,145 | 6/1965 | Summers | 340—18 |

BENJAMIN A. BORCHELT, *Primary Examiner.*

SAMUEL FEINBERG, *Examiner.*

R. M. SKOLNIK, *Assistant Examiner.*

UNITED STATES PATENT OFFICE
CERTIFICATE OF CORRECTION

Patent No. 3,368,196　　　　　　　　　　　　　　February 6, 1968

Roy P. Mazzagatti et al.

It is certified that error appears in the above identified patent and that said Letters Patent are hereby corrected as shown below:

Column 4, line 35, "be elapsed" should read -- the elapsed --; line 48, "Apr. 15, 1960" should read -- Apr. 5, 1960 --. Column 7, line 32, "didoes" should read -- diodes --; line 39, "didoes" should read -- diodes --. Column 8, line 49, "fiberglass" should read -- fiberglas --. Column 11, line 16, "second receiving transducers and second and third" should read -- one end of said first coaxial cable, means including a third --. Column 14, line 34, "tranrformer" should read -- transformer --. Column 16, line 21, "mans" should read -- means --.

Signed and sealed this 19th day of August 1969.

(SEAL)

Attest:

Edward M. Fletcher, Jr.　　　　　　　　　　　　WILLIAM E. SCHUYLER, JR.

Attesting Officer　　　　　　　　　　　　　　　　Commissioner of Patents